Figure 1:
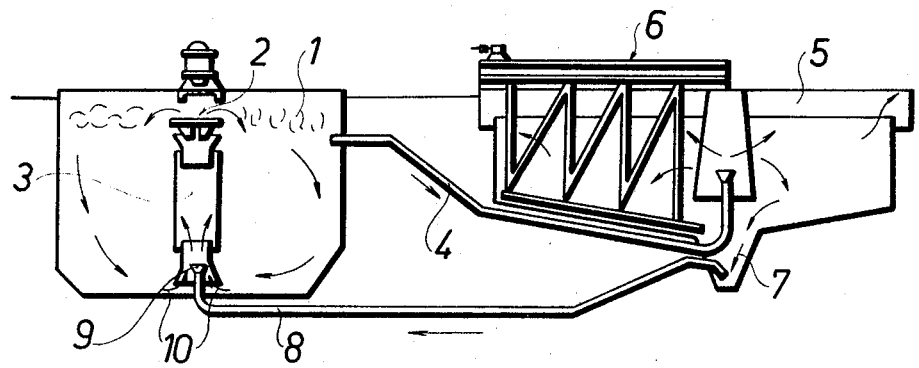

United States Patent

Abraham et al.

[15] 3,682,313
[45] Aug. 8, 1972

[54] APPARATUS FOR THE BIOLOGICAL PURIFICATION OF WASTE WATER

[72] Inventors: Endre Abraham; Laszlo Tasfi, both of Budapest, Hungary

[73] Assignee: Tatabanyai Szenbanyak, Tatbanya, Hungary

[22] Filed: March 2, 1970

[21] Appl. No.: 15,416

[52] U.S. Cl. .....................210/195, 210/14, 210/197
[51] Int. Cl. ...............................................C02c 1/10
[58] Field of Search....................210/195, 197, 3–8, 210/14, 15, 221

[56] References Cited

UNITED STATES PATENTS

| | | | |
|---|---|---|---|
| 3,204,768 | 9/1965 | Daniel | 210/197 |
| 3,515,375 | 6/1970 | Roos | 210/63 X |
| 2,090,384 | 8/1937 | Durdin | 210/197 |

FOREIGN PATENTS OR APPLICATIONS

| | | | |
|---|---|---|---|
| 470,873 | 8/1937 | Great Britain | 210/197 |
| 269,469 | 11/1929 | Italy | 210/197 |

*Primary Examiner*—Michael Rogers
*Attorney*—Gabriel P. Katona

[57] ABSTRACT

Sewage treatment apparatus which is constituted of an oxygenating tank in which water and sludge circulate upwardly through an elongated member, a pipe connecting the oxygenating tank with a settling tank where the sludge is settled out, and a recirculation pipe returns the sludge from the settling tank to the oxygenating tank wherein means are provided for adjusting the amount of circulating water and sludge to an extent of upward flow which corresponds to the amount of recirculating sludge, for optimum performance of the apparatus under a wide range of operating conditions.

3 Claims, 3 Drawing Figures

APPARATUS FOR THE BIOLOGICAL PURIFICATION OF WASTE WATER

The invention relates to a process and an apparatus for the biological purification of waste waters with activated sludge, which permit the recycling of the sludge contained in a setting tank back to the aerating tank without the use of a recycling pump unit, with intense stirring of the contents of said aerating tank and an abundant supply of oxygen required for the biological processes.

In conventional processes for the purification of household and industrial waste waters an apparatus for the intense stirring of the wastes to be purified, a reactor tank and a settling tank connected to it are required. The apparatus acting as reactor tank has the purpose of thoroughly and continuously stirring the mixture of waste water and sludge, and to provide the oxygen required for the biological processes taking place in the mixture. For the purification of industrial wastes the reactor tank has the task of ensuring the intimate blending of the waste to be treated together with a reagent. The separation of the components of the mixture, i.e., the settling of the sludge floating in the mixture takes place in a secondary tank, the settling tank.

In biological purification of waste waters with activated sludge, the sludge settled in a secondary, settling tank is needed as carrier medium for the bacteria required in the biological process hence the sledge must be recycled from the settling tank.

In the conventional apparatus for purifying industrial waste waters recycling into the reactor tank is required when there is an excess amount of reagent, momentarily present in the system, which is a requierement for the efficiency of operation. The conventional installations therefore generally contain, in addition to the said reactor tank and settling tank, a recycling pump unit which takes care of recharging the said sludge-and-reagent mixture from the settling tank to the reactor tank.

It is the object of the invention to improve the conventional systems by providing for control of the amount of the recirculated sludge. According to the invention the recycling of the sludge and reagent into the reactor tank is realized without the need for a separate pump unit, ensuring at the same time the intense blending of the components in the reactor tank, and the oxygen supply necessitated for the biological processes.

The known systems for waste water purification with biologically activated sludge can be classified into three main categories, viz.

1. rotary brush systems with horizontal axis;
2. systems based on air introduction, with superficial or deep penetration,
3. superficial aeration by means of vanes disposed on a vertical shaft.

In the case of industrial wastes generally propeller type or cage type mixers are used. These mixing devices achieve thorough blending of the mixture and, if required, the oxygenation of the mixture.

For the operation of the whole purification installation, however, in all these cases the previously described separate recycling pump unit is required. The invention, on the contrary, permits to ensure all the requirements of the operation of the reactor tank at an optimum level, while at the same time providing for the sludge and reagent recycled from the settling tank to be automatically recharged into the reactor tank without the need for a specially installed pump unit.

In order to promote the better appreciation of the invention, the operation of conventional waste water purification installations as well as the attempts to eliminate the recycling pump units are described below. In the conventional water purification installations the waste water is fed through a conduit to the reactor tank, where the mixture of sludge and water is continuously stirred, with simultaneous oxygenation of the activated sludge required for the purifying operation. The thoroughly blended mixture is conveyed through a tube to the settling tank, where the sludge separates from the water by gravity and settles at the bottom. A scraper conveys the settled sludge to the slurry bed (sump), whence it is recharged by the recycling pump through a pipe to the reactor tank.

The construction of a recycling pipe and a pump unit is not only costly but also constitutes a number of sources of error. It has therefore been repeatedly attempted to dispense with these components. According to one of these suggestions the water-sludge mixture contained in the reactor tank is continually agitated by a mixing device. Mixing is performed by air injection, the air being blown in through an air injector disposed alongside one of the side walls. The mixture thus blended passes through an aperture in the longitudinal side of the tank into a settling tank where the sludge is caused to settle.

Theoretically such installations are self-adjusting, since the settled sludge slides back to the reactor tank through the apertures, but in actual practice the efficiency of recycling is not satisfactory, since recharging of the sludge is effected in a direction contrary to the discharge of water. A further disadvantage of these installations is that the pulsating movement of the water in the reactor tank propagates to the settling tank, and thus impedes, the procedure of settling.

For these reasons the described type of installation could only be utilized in exceptional cases, that is, when the efficiency of sludge recycling is not of importance, or when a relatively small settling tank is required in relation to the oxygenation tank.

In order to eliminate the said drawbacks of the known apparatus, according to the invention the installation comprises a reactor or oxygenating tank, a settling tank, a vertical pipe provided in the oxigenating tank, a mixing device extending into the upper portion of said vertical pipe, a pipe line conveying the blended mixture of sludge and water from the oxygenating tank into the settling tank, and this installation is characterized by a conduit connecting a slurry bed of the settling tank with the oxygenating tank, wherein the extremity of the conduit introduced into the tank reaches into the center axis of the said vertical tube provided in the center line of the tank and protrudes to a slight extent into said tube, and slots of adjustable size are formed by the lower edge of the vertical tube and the bottom plate of the oxygenating tank.

Figure 2:
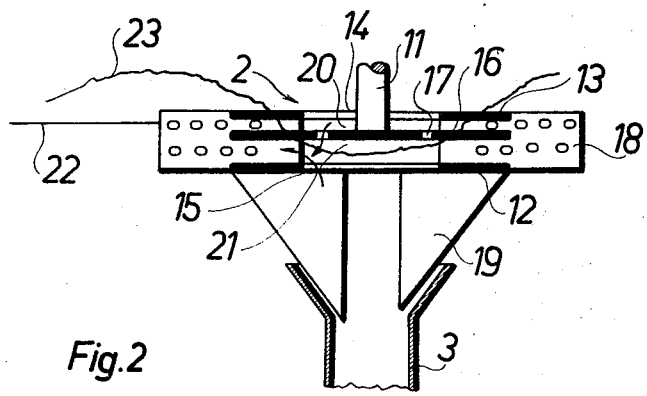
Figure 3:
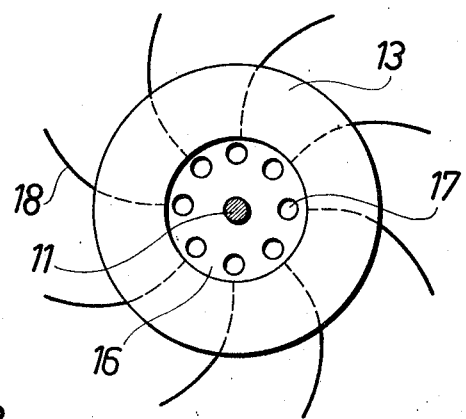

A preferred embodiment of the apparatus according to the invention is more particularly described below with reference to the accompanying drawings, in which FIG. 1 is a schematic vertical section through the entire installation, FIG. 2 is a side view on an enlarged scale of the turbine wheel or rotor of the oxygenating tank, while FIG. 3 is a top view of said turbine wheel.

The mixture of water and sludge contained in the tank 1 is vigorously stirred by means of the mixing device 2, a process which also provides the oxygen supply required for the biological processes taking place in the oxygenation tank. The mixing device is disposed in a tube 3 running vertically centrally in the oxygenation tank, and reaching almost down to the bottom of said tank. The thoroughly blended mixture passes through a pipe 4 to a settling tank 5, where the sludge settles. The settled sludge is conveyed by a scraper means to a slurry bed or sump 7. The slurry bed 7 is connected by a pipe 8 with the oxygenation tank 1. Said pipe 8 enters the tank 1 in vertical direction exactly where the bottom is intersected by the axis line; the extremity 9 of the pipe 8 conveniently protrudes into the tube 3, so as to produce an increased suction effect.

The operation of the installation according to the invention for the purification of waste waters by means of activated sludge is as follows:

When the mixing device 2 starts working in the oxygenation tank 1, it acts as a pump, so that a vast amount of water is sucked up from the tube 3 and spread over the entire water surface. This intense agitation gives rise to a complete mixing or blending of the contents of the tank, at the same time providing the necessary oxygen supply, as well as preventing the settling of the sludge.

Fresh quantities of water penetrate into the tube 3 through an adjustable slot 10, to replace the large amount of liquid sucked up by the tube 3. The slot 10 is formed by the lower edge of the tube 3 and by the bottom of the tank. As a result a circulation is provided within the liquid contained in the tank 1 in the flow direction indicated by the arrows. The flow of liquid sucked up by the tube 3 is countered by the resistance which is defined by the dimensions of the slot and the amount of liquid, said resistance increasing quadratically with the increase of the amount of liquid to be treated. In order to vary the size of the slot, the lower extremity of the tube 3 may be shortened or lengthened telescopically.

If the conveying efficiency of the mixing device 2 is slowly increased, or if the size of the slot 10 is reduced, the resistance of the fluid passing through the slots will increase to such an extent as to exceed the resistance of the pipe 8 running from the bottom of the oxygenating tank 1 to the slurry bed 7 of the settling tank 5. In this case the streaming of the liquid through the pipe 8 is started, which essentially constitutes the recycling or recirculation from the slurry bed 7 to the oxygenating tank 1. Thus, the extremity 9 of the pipe 8 and the mixing device 2 set up axially in the tube 3 must be designed in such a manner as to perform the thorough blending of the water-sludge mixture in the tank 1 on the one hand, and to supply the oxygen necessary for the biological processes which are to take place for activating the sludge on the other hand, together with a considerable and concentrated sucking effect in axial direction.

The operation of the installation according to the invention is simple and highly economical, since it dispenses with the conventional recycling pump units and, accordingly, with the attendance required for operating such pump units.

The turbine wheel represented in FIGS. 2 and 3 is a preferable embodiment of the mixing device. This embodiment consists of an aerating device with a vertical axis, during the rotation of which air is sucked axially from above, with simultaneous suction of liquid from below. The vanes carry out the thorough blending on the sucked-in air and liquid, while at the same time the device gives rise to intense superficial water motion and spraying together with a powerful turbulent action. All these effects are produced by designing the aerating device and especially the turbine wheel in accordance to the invention.

It is to be pointed out that for the same purpose there have been known aerating apparatus or devices of unmovable construction, based on the principle of pressurized air injection, also dynamical aerating devices with horizontal-shaft for superficial aeration, but none of these has the same advantageous effect as the superficial rotors with vertical axis, called aerators. The device illustrated in FIGS. 2 and 3 belongs to this latter type.

A driving mechanism mounted on a bridge construction connected to the upper end of the vertical shaft rotates the aerating turbine wheel, whereupon the body of water carries out a turbulent motion. The motion of said water body is in the upward, axial direction, from the bottom of the tank, and passes helically downward near the sidewalls of the tank. An intense motion is produced on the surface of the water, which has the effect of filling this water layer with oxygen. As a result of the strong turbulence in the tank, the oxygen taken up on the surface of the water is mixed with the entire volume body of water in the tank.

Three concentric disks are mounted on the vertical shaft 11, of which the lower disk 12 and the upper disk 13 have slots 14 and 15 respectively, of conveniently identical size, whereas the central disk 16 is provided with circumferentially disposed apertures 17, preferably arranged along a circle. Symmetrically arranged, arcuate and perforated vanes 18 are fixed to the concentric disks 12, 13, these vanes 18 extending beyond the concentric disks radially in outward direction, while inwardly they extend as far as the diameter corresponding to the apertures 14 and 15. Thus the inner space of the body of the wheel is divided by the vanes 18 into intercommunicating chambers of inwardly tapering cross section.

The generatrix of the vanes considered as cylindrical surfaces, runs parallelly to the shaft 11, and their vertical dimensions are conveniently identical with or exceeding the vertical dimensions of the wheel body consisting of concentric disks. The vanes have downward extending blades which may be pointed (FIG. 2) or trapezoidal (FIG. 1). The blades serve to impart movement to the liquid and this effect can be regulated, since the upper part of the tube 3 may be telescopically raised and lowered (FIG. 1).

With this design of the wheel or rotor the body of the latter is divided in two, by means of the concentric disk 16 disposed in the middle. In the room 20 over the disk 16 the depression produced by the rotation of the turbine wheel has the effect of sucking in air axially from above; the suction effect in the lower part 21 below the disk 16 gives rise to a likewise axial sucking up of liquid. This results in an intimate blending of the sucked-up liquid, along the circumference of the vanes, whereby the desired oxygenation is performed.

The turbine wheel is disposed near the surface of the water. During rotation of the turbine wheel, i.e., the the vanes displace the upper portions of the liquid and exert a simultaneous spraying effect; a suction effect is moreover performed. All this results in a complete mixing of the liquid in the tank, which is in turn equivalent to an intense oxygenation. In addition to these effects large amounts of air are sucked in simultaneously through the apertures 14 in the upper disk, and 17 in the lower disk, respectively.

The mixing device may be disposed at different points of the vertical axis. In some cases it may be of advantage for the liquid level 22 to be slightly below the upper edges of the vanes in the position of rest. During operation the water level will be shaped more or less like the wavy line 23 in FIG. 2.

As a result of the intense motion of the revolved water body the sucked-in air contacts the liquid in the form of fine air droplets, thus saturating the liquid with oxygen. The amount of oxygen so introduced is considerable, and increases the efficiency of the installation substantially.

The turbine wheel according to the invention therefore has a threefold purpose:

a. a powerful whirling and spraying of the water on the surface of the oxygenating tank 1, b. an effective supply of oxygen from the atmosphere, c. vigorous turbulence by means of the axially upwards directed effect of liquid suction.

The data resulting from the experiments made in connection with the invention have clearly shown that the efficiency of the turbine wheel designed according to the invention is considerably higher than that of the known apparatus, for the reason that in addition to the vigorous whirling of the water surface and the spraying, large amounts of the air from the atmosphere are sucked up in the above described manner, whereby the efficiency of oxygen supply is substantially improved. Moreover, experiments have shown that the turbulence caused in the oxygenating tank by the turbine wheel is very much stronger than in similar known constructions.

The above stated advantages, i.e., improved turbulence and ample oxygen supply account for a very high output of the method of oxygenation according to the invention. This presents itself already in the dimensioning when building new installations and, accordingly, in the reduced costs of construction. On the other hand, the capacity of existing, overloaded installations may be increased by means of relatively simple measures and without any considerable investment.

Since the rotation of the wheel gives rise to a considerable suction of liquid in axial upward direction, the use of the turbine wheel according to the invention in installations where such suction effect is anyway required – for instance by means of a separate recycling pump unit – is extremely useful, since the wheel induces such suction effect without special measures and devices.

We claim:

1. Sewage treatment apparatus, comprising an oxygenating tank a settling tank, hollow elongated means in said oxygenating tank for recirculating, circulating, blending and oxygenating sludge and water, first conduit means connecting said oxygenating and settling tanks for conveying the blended mixture of sludge and water from the oxygenating tank to the settling tank, second conduit means connecting said oxygenating and settling tanks for the pumpless recirculation of mainly settled sludge from the settling tank to the oxygenating tank and said elongated means therein, and adjustable means operatively connected to said elongated means for varying to a substantial extent the amount of the circulating water and sludge mixture which enters said elongated means from the oxygenating tank.

2. The sewage treatment apparatus of claim 1, wherein said elongated means comprises at least one tube the position of which is variable relative to the bottom of the oxygenating tank.

3. The sewage treatment apparatus of claim 2, wherein the bottom edge of said vertical tube and the bottom of said oxygenating tank define slots of adjustable size.

* * * * *